United States Patent
Medina

(10) Patent No.: US 8,783,647 B2
(45) Date of Patent: Jul. 22, 2014

(54) COUNTER-BIASED VALVE AND ACTUATOR ASSEMBLY

(71) Applicant: Peter Johann Medina, San Diego, CA (US)

(72) Inventor: Peter Johann Medina, San Diego, CA (US)

(73) Assignee: Synapse Engineering, Inc., San Diego, CA (US)

( * ) Notice: Subject to any disclaimer, the term of this patent is extended or adjusted under 35 U.S.C. 154(b) by 0 days.

(21) Appl. No.: 13/918,450

(22) Filed: Jun. 14, 2013

(65) Prior Publication Data

US 2013/0306888 A1 Nov. 21, 2013

Related U.S. Application Data

(62) Division of application No. 12/717,130, filed on Mar. 13, 2010, now Pat. No. 8,469,333.

(51) Int. Cl.
*F16K 31/00* (2006.01)

(52) U.S. Cl.
USPC .............................. 251/63.5; 251/62; 251/282

(58) Field of Classification Search
USPC ............. 251/50, 62, 63, 63.5, 63.6, 281, 282
See application file for complete search history.

(56) References Cited

U.S. PATENT DOCUMENTS

| | | | | | |
|---|---|---|---|---|---|
| 3,038,499 | A | * | 6/1962 | Dumm | 137/625.5 |
| 3,331,583 | A | * | 7/1967 | Backer | 251/63.5 |
| 4,311,297 | A | * | 1/1982 | Barrington | 251/63.6 |
| 4,791,956 | A | * | 12/1988 | Kominami et al. | 137/503 |
| 5,271,428 | A | * | 12/1993 | Dunn et al. | 137/509 |
| 5,277,403 | A | * | 1/1994 | Waggott et al. | 251/282 |
| 5,386,965 | A | * | 2/1995 | Marchal | 251/282 |
| 5,540,412 | A | * | 7/1996 | Doll | 251/129.07 |
| 5,722,454 | A | * | 3/1998 | Smith et al. | 137/503 |
| 5,769,123 | A | * | 6/1998 | Heestand et al. | 137/625.38 |
| 6,832,748 | B2 | * | 12/2004 | Carroll et al. | 251/30.01 |
| 2001/0005005 | A1 | * | 6/2001 | Bonomi | 251/63 |

* cited by examiner

*Primary Examiner* — John K Fristoe, Jr.
*Assistant Examiner* — Reinaldo Sanchez-Medina
(74) *Attorney, Agent, or Firm* — Thompson Hine L.L.P.

(57) ABSTRACT

Methods for controlling flow are described herein that include a valve assembly provided and operated to control the flow from a first conduit to a second conduit. The valve assembly includes an actuator housing enclosing an actuator piston and defining a counter-biasing chamber and a first control chamber on the same side of the actuator piston, and a first pressure control port in fluid communication with the first control chamber. A valve is connected to the actuator piston and a bore passes through both the actuator piston and the valve thereby placing a face of the valve in fluid communication with the counter-biasing chamber. The actuator piston includes a first substrate area that defines a portion of the counter-biasing chamber and a second substrate area that defines a portion of the first control chamber where the surface area of the first substrate area is less than the surface area of the valve face.

10 Claims, 5 Drawing Sheets

COUNTER-BIASED VALVE AND ACTUATOR ASSEMBLY

CROSS-REFERENCE TO RELATED APPLICATIONS

This application is a divisional of U.S. application Ser. No. 12/717,130, filed Mar. 13, 2010.

FIELD

The embodiments described herein relate to the mechanical arts. More specifically, the present invention relates to valve actuator assemblies.

BACKGROUND

It can be appreciated that valve actuator assemblies have been in use for years. These assemblies control the flow of liquids or gasses in a variety of industrial and mechanical settings. Typically, valve actuator assemblies comprises one of three main types of design: those comprising diaphragm actuators, actuator pistons, or electromechanical actuators. These assemblies are typically used in controlling one or more functions of internal combustion engines or in other industrial applications.

The main drawback with conventional valve actuator assemblies is that the valve typically needs to be biased closed with an extremely high spring pre-load in order to counter-act or negate the force created by the working pressure of fluid (or gas) against the face of the valve. Another problem with conventional valve actuator assemblies is that the high spring pre-load requirement reduces the responsiveness of the actuator to control the valve. Another problem with conventional valve actuator assemblies is that they are typically over-designed to be far more robust than they would otherwise need to be in order to withstand the high spring pressures mentioned heretofore.

While the valve actuator assemblies just described may be suitable for the particular purpose to which they address, it would be desirable to reduce the high spring pressures in order to reduce the design requirements of the valve and actuator and improve responsiveness.

SUMMARY

In view of the foregoing disadvantages inherent in the known types of valve actuator assemblies now present in the prior art, the embodiments described herein provide for a new valve and counter-biased valve actuator assembly. The counter-biased valve and actuator assembly uses a fluid (or gas) working pressure to eliminate, reduce, or overcome a force acting on the face of a valve by communicating a common working pressure of the fluid (or gas) to a substrate with a resultant force vector opposite of the valve face, wherein the same can be utilized for improving the function of the common valve and actuator assembly design as it is known heretofore.

The general purpose of the embodiments described herein, which will be described subsequently in greater detail, is to provide a new valve and valve actuator assembly, counter-biased by a working fluid (or gas) pressure, that has many of the advantages of the valve actuator assemblies mentioned heretofore and many novel features that result in a new valve and valve actuator assembly, counter-biased by working fluid (or gas) pressure, which is not anticipated, rendered obvious, suggested, or even implied by any prior art valve actuator assemblies, either alone or in any combination thereof.

To attain this, the embodiments described herein generally comprise a valve and a pneumatic/hydraulic piston actuator assembly. The valve comprises a standard valve defined by a valve stem and a valve head, the valve head having a valve face. However, the valve differs from the prior art by having a port formed axially through the length of the valve, through the valve face and extending through the end of the valve stem. The port communicates a fluid (or gas) working pressure acting on the valve face to a counter-biasing chamber.

One object of the embodiments described herein is to provide a valve and counter-biased valve actuator assembly, counter-biased by a working fluid (or gas) pressure, that will overcome the shortcomings of prior art devices.

Another object of the embodiments described herein is to provide a valve and valve actuator assembly, counter-biased by a working fluid (or gas) pressure, for improving the function of a common valve and actuator assembly design, as it is known heretofore.

Another object is to provide a valve and valve actuator assembly, counter-biased by working fluid (or gas) pressure, that eliminates, reduces, or overcomes a force acting on the face of a valve by communicating a common working pressure of the fluid (or gas) to a substrate with a resultant force vector opposite the valve face.

Another object is to provide a valve and valve actuator assembly, counter-biased by a working fluid (or gas) pressure, that reduces the need for unnecessarily high spring or force pre-loads to bias the valve closed against the fluid (or gas) working pressure.

Another object is to provide a valve and valve actuator assembly, counter-biased by a working fluid (or gas) pressure, that improves the actuation response time, measured by the ability of the valve to operate at higher frequencies, by reducing or eliminating the spring or force pre-load to bias the valve.

Other objects and advantages of the present invention will become obvious to the reader and it is intended that these objects and advantages are within the scope of the embodiments present herein.

To accomplish the above and related objectives, the embodiments described herein are illustrated in the accompanying drawings, attention being called to the fact, however, that the drawings are for illustrative purposes only, and that changes may be made in the specific construction illustrated without departing from the general concepts described herein.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Valve actuator assemblies are typically used to control the position of a valve in applications to perform flow or pressure regulation through the valve actuator assembly. The embodiments described herein provide for an ability to alter the influence of working pressures acting on a face of a valve in such an assembly. The fluid or gaseous pressure acts on a surface area of the valve face and generally produces a resultant force in a vector normal and opposite to this surface. One of the primary objectives of the embodiments disclosed herein is to reduce, eliminate, or overcome the force of the working pressure on the valve face.

Figure 1:
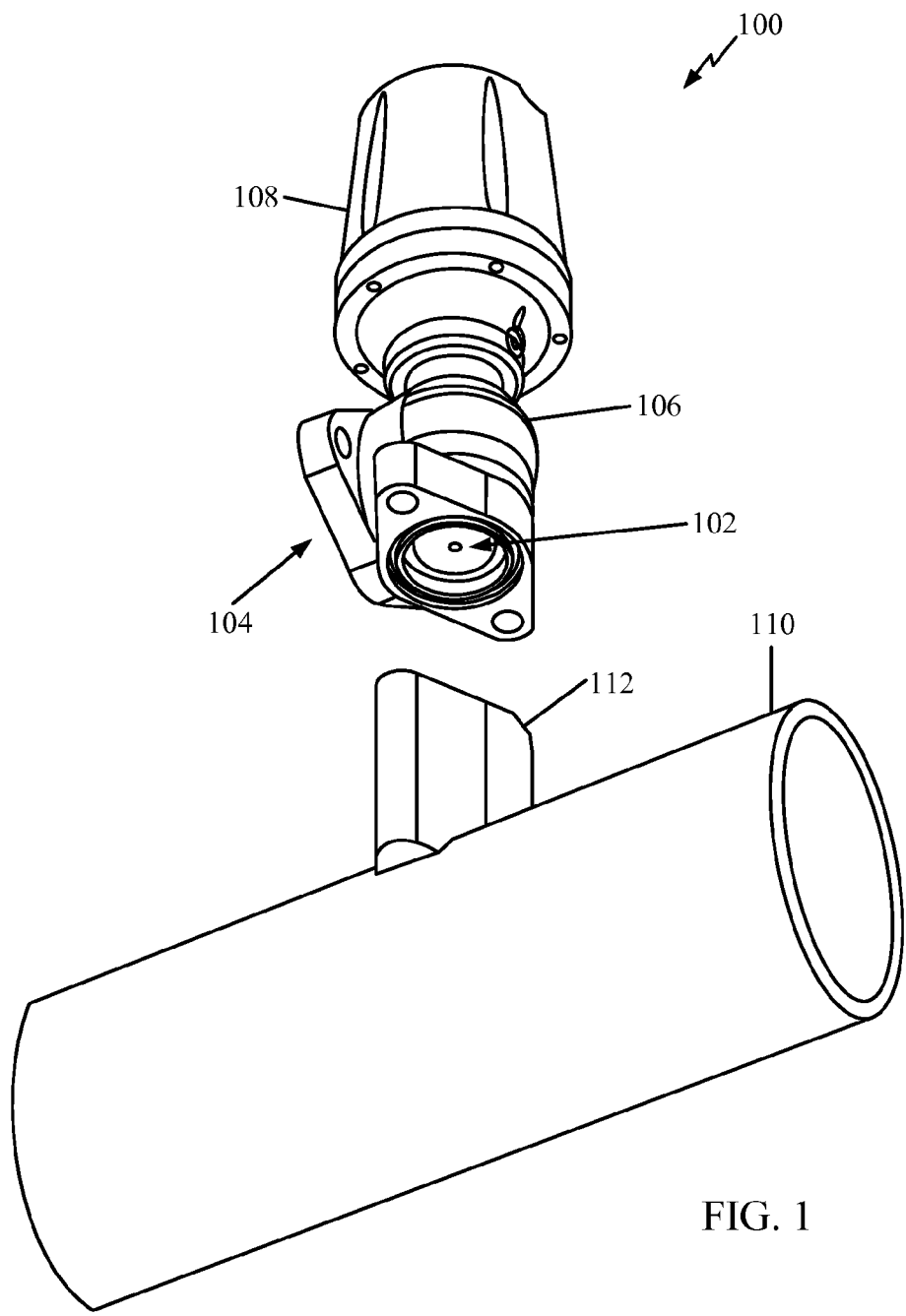
FIG. 1 illustrates a valve actuator assembly in accordance with one embodiment, shown in a perspective view.

Turning now to the drawings, FIG. 1 illustrates a valve actuator assembly in accordance with one embodiment, shown in a perspective view. Valve actuator assembly 100 comprises an inlet port 102, an outlet port 104, a valve housing 106, and an actuator housing 108. Other components of valve actuator assembly 100, not visible in FIG. 1, will be described later herein. Valve actuator assembly 100 attaches to conduit 110 via channel 112 via screws or other known fastening methods. It should be understood that inlet port 102 and outlet port 104 may be interchanged, i.e., fluid or gas may, alternatively, enter port 104 and exit via port 102. Outlet port 104 connects to a second conduit (not shown) which carries the gas or liquid from outlet port 104. The flow of fluid or gas from conduit 110 to the second conduit is controlled by a valve contained within valve actuator assembly, which is described in more detail below.

The actuator housing 108 is defined in one embodiment to mate with an actuator piston (not shown), the resultant combination thus functioning as a single-tier actuator piston. Their mating defines at least two volumetric chambers in the actuator housing 108, which will be described in greater detail later herein.

The actuator housing 108 is typically characterized as a two-component structure modeled about the geometry of the actuator piston. In one embodiment, the actuator housing assembly takes the form of two-chambers and has the ability to accommodate either the actuator piston based on a two-substrate diaphragm or a singular component design. In another embodiment, the actuator housing is defined by the geometry of a multi-tiered actuator piston described in FIG. 3 later herein.

Figure 2:
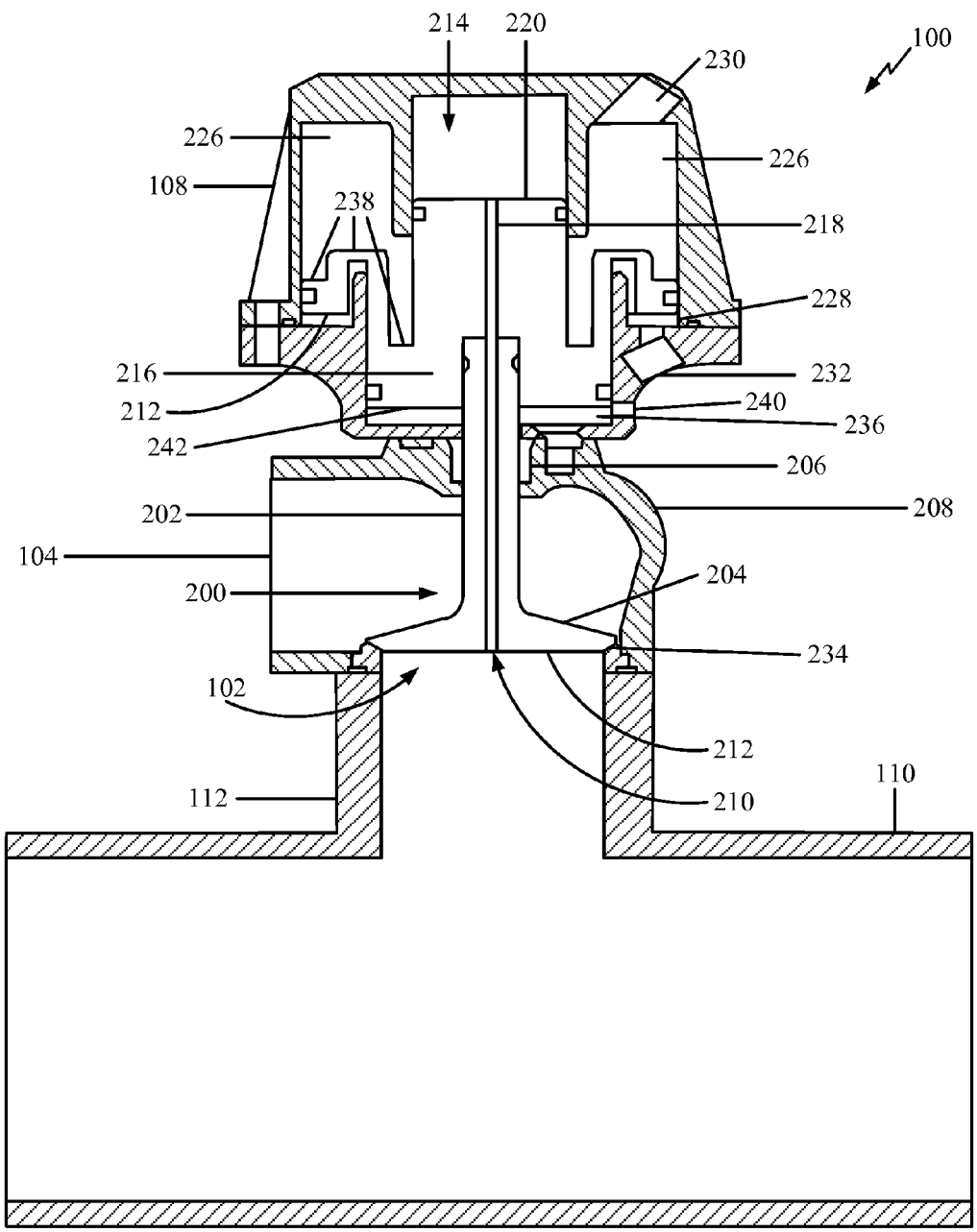
FIG. 2 illustrates the valve actuator assembly of FIG. 1 in a cutaway view.

FIG. 2 illustrates the valve actuator assembly 100 of FIG. 1 in a cutaway view. Shown is valve actuator assembly 100 mounted to a conduit 110 via channel 112. Valve actuator assembly 100 is typically secured to channel 112 via retaining screws or some other type of mechanical fastener. Valve actuator assembly 100 comprises a valve 200, which is commonly known as a "poppet" valve. Other types of valves could be used in alternative embodiments. Valve 200 is defined by a valve stem 202 and valve head 204, the valve head 204 having a valve face 212. Valve 200 is secured via a channel 206 formed between valve housing 208 and actuator housing 108, with one end of valve 200 being retained within actuator piston 216, as shown. The actuator piston 216 generally retains the valve 200 so as to impart resultant fluid or gaseous pressures acting on substrate areas of the piston, as will be explained in more detail below.

Figure 5:
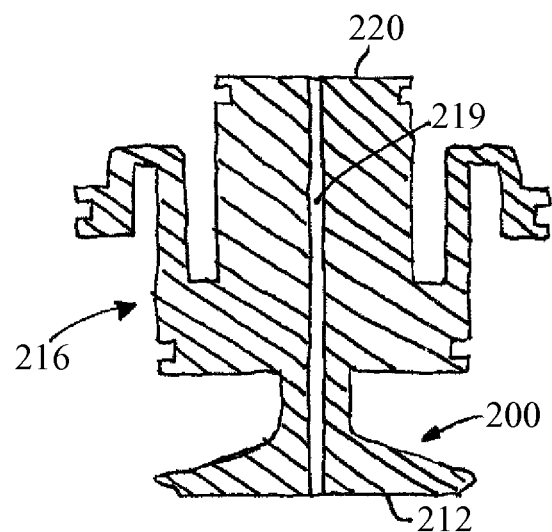
FIG. 5 is a cross-section of a monolithic actuator piston and valve of similar shape to the actuator piston and valve assembly illustrated in FIG. 2.

Valve 200 further comprises a port 210 defined axially through the entire length of valve 200, including stem 202 and valve face 212. A second port 218 is defined through actuator piston 216 that is at least partially aligned with port 210 in valve 200. The combined ports 210 and 218 form an opening or conduit that communicates working fluid (or gas) pressure from the conduit 110 acting on the valve face 212 to a counter-biasing chamber 214. In another embodiment, as shown in FIG. 5, the valve 200 and actuator piston 216 are formed as a single unit having a single port 219 formed through the entire structure, from valve face 212 through substrate area 220.

The substrate area 220 of actuator piston 216 in the counter-biasing chamber 214 forms a surface that is subjected to a resultant vector force asymmetrically normal to the force imposed against valve face 212. In other words, the fluid or gas pressure in conduit 110 is imparted to counter-biasing chamber 214 via ports 210 and 218, which acts on the substrate area 220 of actuator piston 216, driving actuator piston 216 down, in this case, towards conduit 110. The force on actuator piston 216 is proportional to the amount of surface area of substrate area 220; the larger the surface area, the greater the force on actuator piston 216.

The actuator piston 216 acts as both the main actuator and valve retainer. In one embodiment, as shown in FIG. 2, the actuator piston in combination with housing 108 forms multiple pressure control chambers 214, 226, 228 and 236. Each of these control chambers are associated with a substrate area, or surface, of a portion of actuator piston 216, which. These are shown as substrate areas 220, 238, 222, and 242, respectively, shown in bold. It should be understood that these control chambers and substrate areas have a cross section that is generally associated with the overall geometry of the actuator housing 108, in this embodiment, circular when viewed from above. Each of the pressure control chambers is connected to a respective pressure control port, shown as pressure control ports 210/218, 230, 232, and 240, respectively.

The force exerted on actuator piston 216 is in proportion to the pressures seen inside each of the control chambers and associated substrate areas of piston actuator 216 upon which the pressure is exerted. The number of control chambers may vary depending upon the application. In addition, the number of chambers in use in any particular application may vary. For example, a valve actuator assembly could be designed and built comprising 3 control chambers, while in use, only applying a pressure control signal to two of the three control chambers. Any unused control chambers may be sealed by installing a cap onto a respective pressure control port or they may be left open to atmospheric pressure, depending upon the particular application.

The actuator piston 216 is generally defined by, but not limited to, three commonly known geometries. In one embodiment, as shown in FIG. 2, the actuator piston 216 comprises a simple valve retainer that is connected to a two-substrate flexible diaphragm. In another design, the actuator piston 216 comprises a single component that retains the valve and has two substrate areas in counter axial orientations. In yet another embodiment, the actuator piston 216 comprises a multi-tiered design as described by U.S. Pat. No. 6,863,260 wherein it acts as a retainer, but also defines four volumetric chambers and four actuation substrates. This design is described in FIG. 3 and explained as follows.

Figure 3:
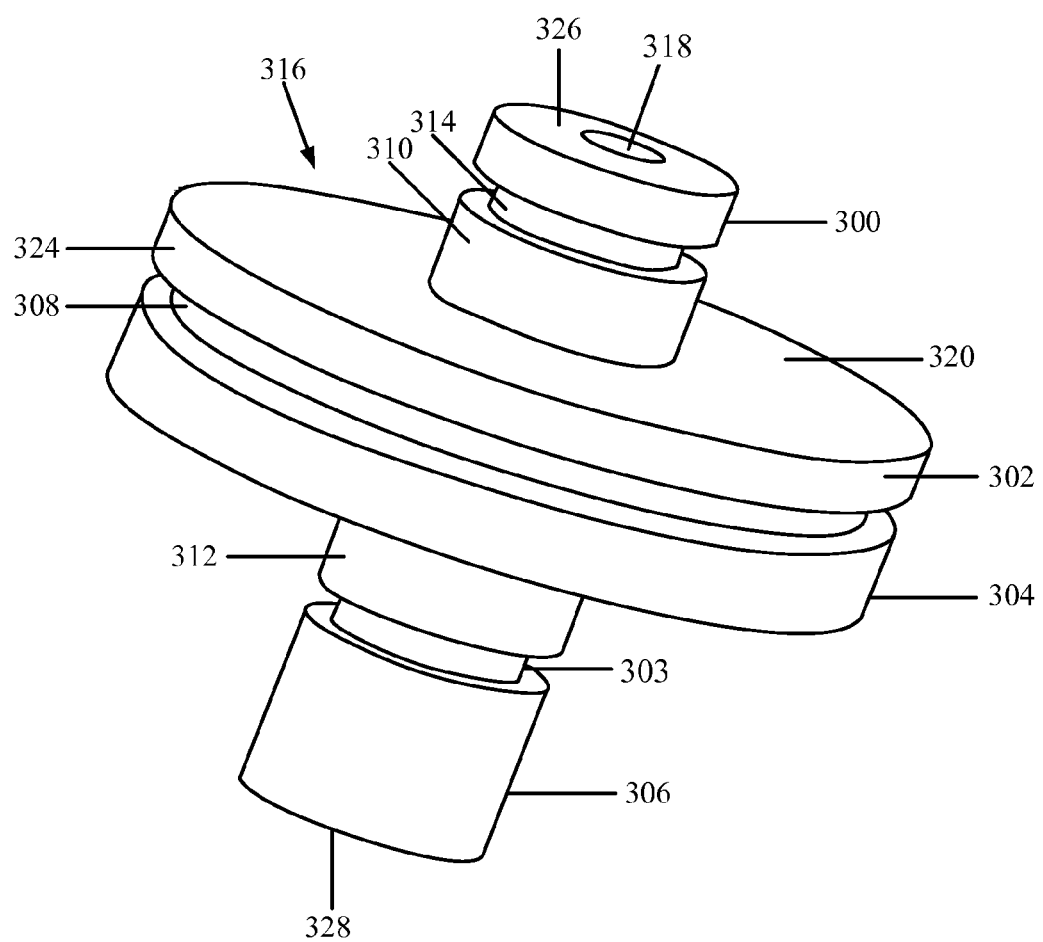
FIG. 3 illustrates another embodiment of an actuator piston used within the valve actuator assembly of FIG. 1 or FIG. 2.

FIG. 3 illustrates another embodiment of actuator piston 216, shown here as actuator piston 316. As shown, actuator piston 316 comprises an elliptical or polygonal-profiled object extruded in one axis of varying diameters. Actuator piston 316 comprises a shaft 318 and tiers 300-314, each tier comprising a different geometric profile from other tiers, or levels, extruded on actuator piston 316. Each tier may have different diameters, widths or dimensions to define a surface area available for a pressure control signal to act upon. Shaft 318 comprises a longitudinal extension, such as a rod, or cylinder, having one of any number of cross-sections, extending the length of actuator piston 316 around which the various tiers are imposed. Shaft 318 additionally comprises a first shaft end 326 and a second shaft end 328. In some cases, a tier may have a diameter equal to the diameter of shaft 318, for example, tiers 300, 310, 312, and 306. A resultant force on actuator piston 316 is produced by the combination of pressure control signals acting upon the different surface areas defined by the tiers.

The geometric profiles representing the tiers do not necessarily have to be axially aligned. The most common implementation of actuator piston 316 will be one wherein actuator piston 316 will travel in an axial direction that is perpendicular to the geometric profiles of the tiers. The piston/housing relationship typically assumes that actuator piston 316 will be the component that will travel and move in relation to the actuator housing 108.

Each tier generally comprises a top surface, a bottom surface, and an outer wall, such as top surface 320, and an outer wall 324 (a bottom surface not shown). A top surface of one tier may be a bottom surface of another tier. For example, top surface 320 of tier 302 is the same surface as a bottom surface of tier 310; the bottom surface of tier 302 is the same surface as a top surface of tier 308. As mentioned previously, the outer walls of some, or all, of the tiers are in contact with the various inner walls defining cavities of actuator housing 108. This contact forms chambers that change in volume as either actuator piston 316, or actuator housing 108, travels along an axis common to both components. The surfaces of the cavity inner walls may act as a sealing surface with either the material of the tiers or with a seal housed by, or integrated into, the tier outer walls. Alternatively, actuator housing 108 may comprise materials for providing a sealing surface with the tiers. Furthermore, independent seals such as O-rings, for example, can also be integrated into the tiers and/or shaft 318, to mate with the housing cavity inner surfaces to create a seal. Any number of existing seal technologies can be integrated into actuator piston 316, including, but not limited to, o-rings, washers and metal seals. In the example of FIG. 3, such independent seals may be placed around tier 314, tier 308, or tier 303.

Although shown in FIG. 3 as a piston of single-piece construction, actuator piston 316 can alternatively be constructed of distinct and separate objects that fit the aforementioned description and that are connected together to form resultant actuator piston 316. Accordingly, actuator piston 316 may be manufactured of any currently available materials, such as plastic, metal, or any other rigid or semi-rigid material, depending on each particular application.

Referring back to FIG. 2, pressure control signals may be communicated to control chambers 226, 228, and 236 via pressure control ports 230, 232, and 240, respectively, to control operation of valve 202. These pressures each may be applied as positive pressures or negative pressures and may originate from different sources. The pressure control signals typically comprise gas, liquids, or a combination of the two. In addition, each pressure control port could transmit a unique pressure type. For example, the pressure control signal communicated to pressure control port 230 could comprise a gas while the pressure control signal communicated to pressure control port 232 could comprise a liquid. The pressure control signals introduced to pressure control ports 230, 232, and 240 can either be the same or mutually exclusive, and may be introduced at varying points in time so as to control the position of valve 202 relative to sealing surface 234, and thereby controlling the flow of material from discharge port 104. In any given application, there can exist a multiplicity of chambers defined by annular walls, end walls, and tier surfaces used to create forces operating against actuator piston 216. The quantity of such chambers, tier surface areas, or other chamber-defining characteristics need not be equal or similar.

Actuator piston 216 will move in one of two directions, either up or down with respect to actuator housing 108. For example, if a pressurized fluid is communicated through pressure control port 232 into control chamber 228, that fluid, barring any other forces acting on actuator piston 216, will act to effectively move the actuator piston 216 in a direction that allows for the expansion of the pressurized fluid or gas into chamber 228. The actuator piston 216 will move in a direction where the force will find a differential, i.e., in an upward movement in this example, or away from conduit 110 and, in turn, cause valve 200 to open with respect to sealing surface 234.

The actuator piston 216 will be displaced in a direction proportional to the net combined force operating against each substrate surface and the valve face. Each of the forces against the substrate surfaces are, in turn, proportional to pressure signals applied via pressure control ports and into respective pressure control chambers, against respective substrate surface areas. For example, a positive pressure signal applied to control chamber 226 via pressure control port 230 would be offset an equal, positive pressure signal applied to control chamber 228 via pressure control port 232 if both substrate areas 238 and 222 are equal in surface area. In this case, piston actuator 216 and valve 200 would not move. In another example, if the same pressures were applied to control chambers 226 and 228, but the surface area of substrate 238 was twice as great as the surface area of substrate 222, then the piston actuator 216 would move toward the closed position shown in FIG. 2. In yet another example, if a positive pressure is communicated to pressure control port 230 and a negative pressure is communicated to pressure control port 232, and the tier surfaces of each control chamber are equal, the actuator piston 216 will move in a downward direction at twice the force of each individual pressure control signal (assuming, of course, that the valve 202 has not yet contacted sealing surface 234).

Assembly of valve actuator assembly 100 generally begins with the actuator housing 108 mating with the actuator piston 216, which then mates with the valve 202 and finally valve housing 208. There are several permutations of design and assembly available. Other embodiments may find that the design requirements necessitate a one-piece valve and actuator piston design. The interconnectivity of the components would be fundamentally unchanged however.

There exists myriad methodologies to manufacture these components. Processes that can be used include, but are not limited to, investment casting, die casting, injection molding and wrought machining. Materials that can be used can include, but are not limited to, ferrous and non-ferrous metals, plastics and advanced resin-based composites.

Figure 4:
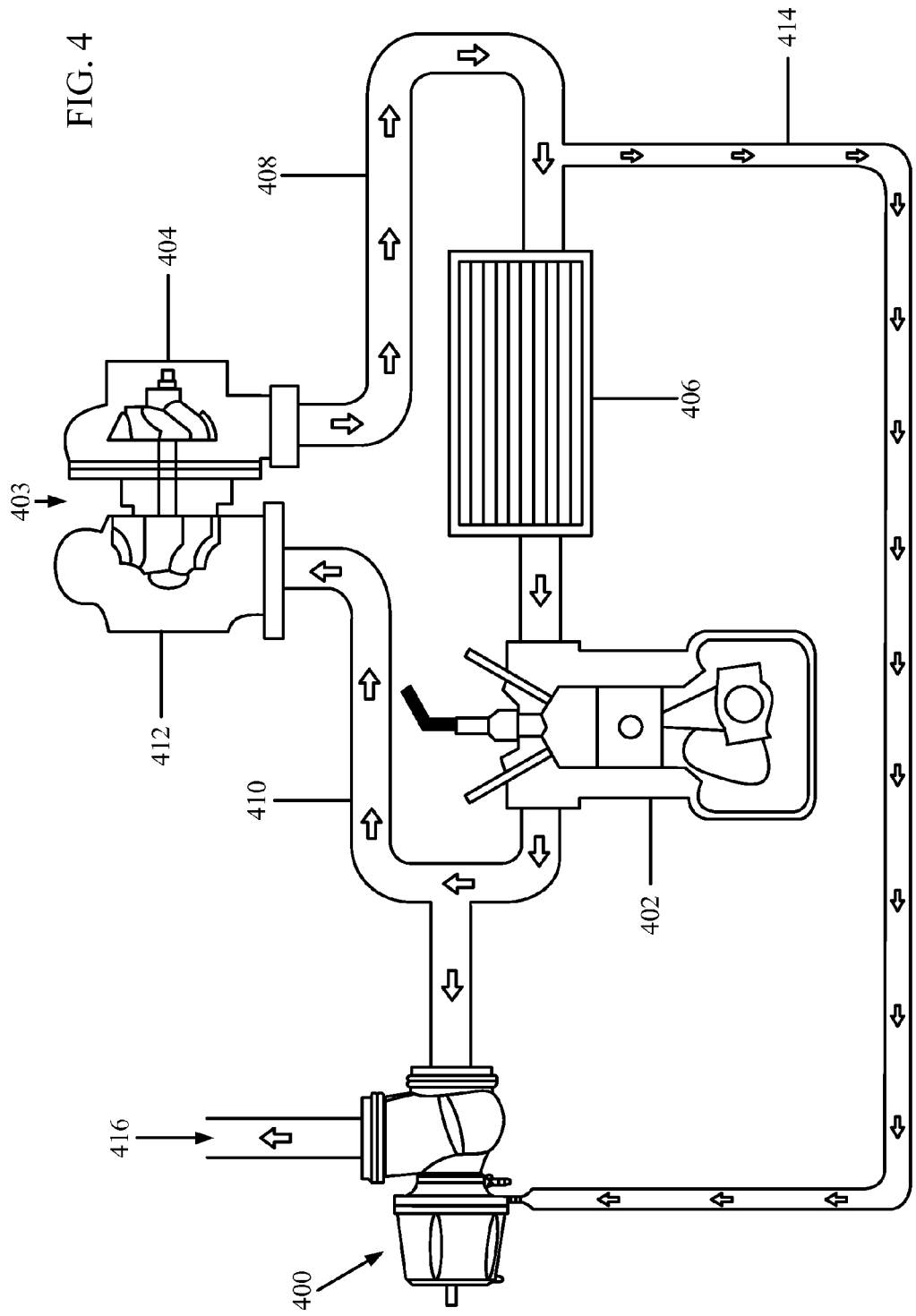
FIG. 4 illustrates the valve actuator assembly of FIG. 1 or FIG. 2 used in a typical automotive application, in this example, a turbocharged automotive engine.

FIG. 4 illustrates a valve actuator assembly 400 used in a typical automotive application, in this example, a turbocharged automotive engine 402. Ambient air enters an inlet 404 of turbocharger 403 to be compressed and routed to a charge cooler 406 via ducting 408. The compressed air then enters the engine 402 and the spent gases exit through ducting 410 and into an inlet of an exhaust turbine section 412 of turbocharger 403. In order to regulate the operating speed of the turbocharger, a regulating valve, commonly known as a wastegate, is generally required. These mechanical valve assemblies typically comprise a common "poppet" valve that regulates exhaust gas pressure and flow entering the turbocharger. The valve is typically biased in the closed position by a spring inside a valve housing assembly. In the example of FIG. 4, this regulating valve comprises valve actuator assembly 400 as described previously hereto. The valve inside valve actuator assembly 400 may be biased in a closed position by a spring and the valve and actuator inside the valve assembly 400 comprises ports 210 and 218 to respond to the pressure of the gas inside ducting 410 acting on the valve face. Attributes of the spring, such as the size, restoring force, and spring constant, is typically reduced from what would normally be required to bias the valve in the closed position, due to the equalizing effect of ports 218 and 210.

In the example of FIG. 4, valve actuator assembly 400 is controlled by an actuating pressure control signal 414 from the compressed ambient air from turbocharger 403 prior to entering cooler 406. It should be understood that this pressure control signal 414 could, alternatively, originate from the outlet of cooler 406 or be supplied from a source other than the components shown in FIG. 4. In the example of FIG. 4, the pressure control signal 414 is a positive pressure, connected to pressure control port 232, that operates to open the valve inside the actuator assembly 400. As the valve is opened, exhaust gases from ducting 410 are passed by the valve actuator assembly 400 and discharged through conduit 416, typically to ambient air or a noise-suppression system. As the valve inside valve actuator assembly 400 opens, pressure and flow of exhaust gasses is reduced inside ducting 410, thereby slowing the rotation of turbocharger 403. If the pressure inside ducting 408 becomes too small, pressure control signal 414 likewise is reduced, causing the valve inside valve actuator assembly 400 to close, thereby increasing the pressure inside ducting 410. As a result, turbocharger 403 increases it's rotation. In this manner, a feedback loop is established to regulate turbocharger 403.

It should be noted that in this example, there is only one pressure control signal applied to the valve actuator assembly, pressure control signal 414 connected to pressure control port 232. The second pressure control port remains unconnected. In this arrangement, the force of the exhaust inside ducting 410 and the pressure control signal 414 acts to push the valve open, while a biasing spring acts to close the valve. In other embodiments, the second pressure control port can be connected to a second pressure control signal to further control operation of the valve. In still other embodiments, valve actuator assembly 400 could comprise more than two pressure control ports, each pressure control port connected to a particular control chamber within the valve actuator assembly. Finally, in other embodiments, one or more unused ports may be capped so that any gases inside respective control chambers remains trapped inside those control chambers.

With respect to the above description, it is to be realized that the optimum dimensional relationships of the various components of the pipe couplers include variations in size, materials, shape, form, function and manner of operation, assembly and use, and are deemed readily apparent and obvious to one skilled in the art. All equivalent relationships to those illustrated in the drawings and described in the specification are intended to be encompassed by the embodiments described herein. Therefore, the foregoing is considered as illustrative only of the principles and descriptions provide herein. Further, since numerous modifications and changes may be contemplated by those skilled in the art, it is not desired to limit the embodiments described herein to the exact construction and operation shown and described, and accordingly, all suitable modifications and equivalents may be resorted to, falling within the scope of the present disclosure.

What is claimed is:

1. A method for controlling flow, comprising:
providing a valve assembly to control fluid or gaseous flow from a first conduit to a second conduit, the valve assembly comprising:
an actuator housing;
an actuator piston disposed within the actuator housing to define a counter-biasing chamber and at least a first control chamber on the same side of the actuator piston, wherein the actuator piston includes a first substrate area that defines a portion of the counter-biasing chamber and a second substrate area that defines a portion of the first control chamber;
a valve connected to the actuator piston, the valve having a valve face;
a bore passing through the actuator piston and the valve thereby placing the valve face in fluid communication with the counter-biasing chamber; and
a first pressure control port in fluid communication with the first control chamber;
wherein the surface area of the first substrate area is less than the surface area of the valve face;
operating the valve by applying a first pressure control signal to the first pressure control port on the actuator assembly.

2. The method of claim 1, wherein the valve assembly further comprises a second control chamber defined by the actuator piston and the actuator housing, and a second pressure control port in fluid communication with the second control chamber; wherein operating the valve includes applying a second pressure control signal to the second pressure control port on the actuator assembly.

3. The method of claim 2, wherein the second control chamber is positioned on an opposite side of the actuator piston relative to the position of the first control chamber and the counter-biasing chamber.

4. The method of claim 1, further comprising: providing a turbocharged engine, and operatively connecting the valve assembly into the turbocharged engine.

5. The method of claim 4, wherein the valve assembly is an exhaust flow control valve, and wherein operating the valve includes regulating exhaust gas pressure entering a turbocharger of the turbocharged engine.

6. The method of claim 1, wherein the valve comprises a poppet valve.

7. The method of claim 1, wherein applying the first pressure control signal includes applying a positive pressure or a negative pressure from the same source or different sources.

8. The method of claim 2, wherein operating the valve includes applying mutually exclusive first pressure and second pressure control signals.

9. The method of claim 8 wherein the mutually exclusive first pressure and second pressure control signals are introduced at varying points in time.

10. The method of claim 8, wherein operating the valve includes applying pressure to the first substrate area acts on the actuator piston to bias the valve toward or into a closed position as a result of a net of combined forces acting on the piston actuator.

* * * * *